United States Patent
Cronin

(10) Patent No.: US 9,391,988 B2
(45) Date of Patent: Jul. 12, 2016

(54) COMMUNITY BIOMETRIC AUTHENTICATION ON A SMARTPHONE

(71) Applicant: GrandiOs Technologies, LLC, Wilmington, DE (US)

(72) Inventor: John Cronin, Bonita Springs, FL (US)

(73) Assignee: GRANDIOS TECHNOLOGIES, LLC, Charleston, SC (US)

( * ) Notice: Subject to any disclaimer, the term of this patent is extended or adjusted under 35 U.S.C. 154(b) by 0 days.

(21) Appl. No.: 14/622,808

(22) Filed: Feb. 13, 2015

(65) Prior Publication Data

US 2015/0358316 A1    Dec. 10, 2015

Related U.S. Application Data

(60) Provisional application No. 62/007,786, filed on Jun. 4, 2014.

(51) Int. Cl.
  G06F 21/32   (2013.01)
  H04L 9/32    (2006.01)
  H04L 29/06   (2006.01)

(52) U.S. Cl.
  CPC ............ *H04L 63/0861* (2013.01); *G06F 21/32* (2013.01); *H04L 9/3231* (2013.01); *H04L 9/3255* (2013.01)

(58) Field of Classification Search
  CPC ...... G06F 21/32; H04L 9/3231; H04L 9/3255
  See application file for complete search history.

(56) References Cited

U.S. PATENT DOCUMENTS

| | | |
|---|---|---|
| 6,104,922 A | 8/2000 | Baumann |
| 6,697,947 B1 | 2/2004 | Matyas, Jr. et al. |
| 6,928,546 B1 | 8/2005 | Nanavati et al. |
| 7,000,116 B2 | 2/2006 | Bates et al. |
| 7,433,685 B2 | 10/2008 | Ritter |
| 7,835,721 B2 | 11/2010 | Tuulos et al. |

(Continued)

FOREIGN PATENT DOCUMENTS

| | | |
|---|---|---|
| WO | PCT/US2015/32998 | 5/2015 |
| WO | WO 2015/168703 | 11/2015 |

(Continued)

OTHER PUBLICATIONS

Busch, Christop; "Biometric Transaction Authentication Protocol (BTAP)" Fraunhofer IGD, Gjovik University College, Aug. 26, 2011.

(Continued)

*Primary Examiner* — Dede Zecher
*Assistant Examiner* — Jason C Chiang
(74) *Attorney, Agent, or Firm* — Polsinelli LLP

(57) ABSTRACT

Methods and systems are presented for performing biometric authentication of a plurality of users on a user device (e.g., smartphone). In some embodiments, a user may specify in biometric settings certain biometric authentication applications to be used with a group biometric authentication system. A user may additionally specify in biometric settings other users to add to a biometric authentication group. A user may perform functions or access data in biometric authentication-enabled applications (e.g., a financial application) that require the biometric authentication of one or more other users by transmitting a request to the user device of the one or more other users for the required biometric data (e.g., a fingerprint scan).

19 Claims, 6 Drawing Sheets

(56) References Cited

U.S. PATENT DOCUMENTS

| | | | |
|---|---|---|---|
| 8,464,320 B2 | 6/2013 | Archer et al. | |
| 8,467,770 B1 | 6/2013 | Ben Ayed | |
| 8,577,042 B2 | 11/2013 | Worthy | |
| 8,589,667 B2 | 11/2013 | Mujtaba et al. | |
| 8,611,930 B2 | 12/2013 | Louboutin et al. | |
| 8,620,344 B2 | 12/2013 | Huang et al. | |
| 8,626,465 B2 | 1/2014 | Moore et al. | |
| 8,630,216 B2 | 1/2014 | Deivasigamani et al. | |
| 8,646,060 B1 | 2/2014 | Ben Ayed | |
| 8,660,501 B2 | 2/2014 | Sanguinetti | |
| 8,706,044 B2 | 4/2014 | Chang et al. | |
| 8,724,723 B2 | 5/2014 | Panicker et al. | |
| 8,750,207 B2 | 6/2014 | Jeong et al. | |
| 8,793,094 B2 | 7/2014 | Tam et al. | |
| 8,816,868 B2 | 8/2014 | Tan et al. | |
| 8,831,529 B2 | 9/2014 | Toh et al. | |
| 8,831,655 B2 | 9/2014 | Burchill et al. | |
| 8,836,851 B2 | 9/2014 | Brunner | |
| 8,838,071 B1 | 9/2014 | Cronin | |
| 8,843,158 B2 | 9/2014 | Nagaraj | |
| 8,849,308 B2 | 9/2014 | Marti et al. | |
| 8,862,060 B2 | 10/2014 | Mayor | |
| 8,873,418 B2 | 10/2014 | Robinson et al. | |
| 8,874,090 B2 | 10/2014 | Abuan et al. | |
| 8,917,632 B2 | 12/2014 | Zhou et al. | |
| 8,934,921 B2 | 1/2015 | Marti et al. | |
| 8,973,110 B2* | 3/2015 | Mizoguchi et al. | 726/5 |
| 9,288,207 B2 | 3/2016 | Cronin | |
| 2002/0138767 A1 | 9/2002 | Hamid et al. | |
| 2003/0046083 A1 | 3/2003 | Devinney et al. | |
| 2003/0074317 A1* | 4/2003 | Hofi | 705/44 |
| 2003/0135740 A1 | 7/2003 | Talmor et al. | |
| 2004/0049675 A1 | 3/2004 | Micali et al. | |
| 2004/0148526 A1 | 7/2004 | Sands et al. | |
| 2005/0195076 A1 | 9/2005 | McCulloch et al. | |
| 2005/0268107 A1* | 12/2005 | Harris et al. | 713/182 |
| 2005/0273444 A1 | 12/2005 | Delgrosso et al. | |
| 2007/0032225 A1 | 2/2007 | Konicek | |
| 2007/0192137 A1 | 8/2007 | Ombrellaro | |
| 2007/0273471 A1 | 11/2007 | Shilling et al. | |
| 2008/0086767 A1* | 4/2008 | Kulkarni et al. | 726/9 |
| 2008/0102790 A1* | 5/2008 | Schultz | 455/410 |
| 2008/0189776 A1 | 8/2008 | Constable | |
| 2008/0211627 A1* | 9/2008 | Shinzaki | 340/5.82 |
| 2008/0261560 A1 | 10/2008 | Ruckart | |
| 2008/0305766 A1 | 12/2008 | Falk | |
| 2009/0126013 A1* | 5/2009 | Atwood | G06Q 40/02 726/22 |
| 2009/0170532 A1 | 7/2009 | Lee et al. | |
| 2009/0186633 A1 | 7/2009 | Yonker et al. | |
| 2009/0190802 A1 | 7/2009 | Adams et al. | |
| 2009/0265544 A1 | 10/2009 | Moona et al. | |
| 2010/0005293 A1 | 1/2010 | Errico | |
| 2010/0240415 A1 | 9/2010 | Kim et al. | |
| 2010/0253470 A1 | 10/2010 | Burke | |
| 2011/0107427 A1 | 5/2011 | Cohen et al. | |
| 2011/0215597 A1 | 9/2011 | Weum | |
| 2011/0239270 A1 | 9/2011 | Sovio et al. | |
| 2011/0252464 A1 | 10/2011 | Sanjeev | |
| 2012/0072996 A1 | 3/2012 | Svendsen et al. | |
| 2012/0121140 A1 | 5/2012 | Gerken | |
| 2012/0144464 A1 | 6/2012 | Fakhrai | |
| 2012/0268241 A1 | 10/2012 | Hanna et al. | |
| 2012/0297464 A1 | 11/2012 | Busch et al. | |
| 2013/0103951 A1 | 4/2013 | Klevan et al. | |
| 2013/0117833 A1* | 5/2013 | Ochi | G06F 21/32 726/7 |
| 2013/0247156 A1* | 9/2013 | Savo | 726/4 |
| 2013/0269013 A1 | 10/2013 | Parry et al. | |
| 2013/0303192 A1 | 11/2013 | Louboutin | |
| 2013/0317835 A1 | 11/2013 | Mathew | |
| 2013/0318580 A1 | 11/2013 | Gudlavenkatasiva et al. | |
| 2013/0328917 A1 | 12/2013 | Zambetti et al. | |
| 2013/0331087 A1 | 12/2013 | Shoemaker | |
| 2013/0331118 A1 | 12/2013 | Chhabra | |
| 2013/0331137 A1 | 12/2013 | Burchill | |
| 2013/0332108 A1 | 12/2013 | Patel | |
| 2013/0332156 A1 | 12/2013 | Tackin | |
| 2014/0002388 A1 | 1/2014 | Han et al. | |
| 2014/0003683 A1 | 1/2014 | Vieta et al. | |
| 2014/0004828 A1 | 1/2014 | Han et al. | |
| 2014/0006795 A1 | 1/2014 | Han et al. | |
| 2014/0007185 A1 | 1/2014 | Han et al. | |
| 2014/0007223 A1 | 1/2014 | Han et al. | |
| 2014/0007225 A1* | 1/2014 | Gay et al. | 726/19 |
| 2014/0062773 A1 | 3/2014 | MacGougan | |
| 2014/0065962 A1 | 3/2014 | Le | |
| 2014/0071221 A1 | 3/2014 | Dave | |
| 2014/0105084 A1 | 4/2014 | Chhabra | |
| 2014/0106711 A1 | 4/2014 | Seo et al. | |
| 2014/0139380 A1 | 5/2014 | Ouyang | |
| 2014/0141803 A1 | 5/2014 | Marti | |
| 2014/0162628 A1 | 6/2014 | Bevelacqua | |
| 2014/0167794 A1 | 6/2014 | Nath | |
| 2014/0168170 A1 | 6/2014 | Lazarescu | |
| 2014/0171114 A1 | 6/2014 | Marti | |
| 2014/0180820 A1 | 6/2014 | Louboutin | |
| 2014/0191979 A1 | 7/2014 | Tsudik | |
| 2014/0196106 A1 | 7/2014 | Zellner | |
| 2014/0200053 A1 | 7/2014 | Balasubramanian | |
| 2014/0222335 A1 | 8/2014 | Piemonte | |
| 2014/0232633 A1 | 8/2014 | Shultz | |
| 2014/0232634 A1 | 8/2014 | Piemonte | |
| 2014/0247279 A1 | 9/2014 | Nicholas | |
| 2014/0247280 A1 | 9/2014 | Nicholas | |
| 2014/0269562 A1 | 9/2014 | Burchill | |
| 2014/0270415 A1* | 9/2014 | Alameh et al. | 382/124 |
| 2014/0274150 A1 | 9/2014 | Marti | |
| 2014/0283135 A1 | 9/2014 | Shepherd | |
| 2014/0293959 A1 | 10/2014 | Singh | |
| 2014/0364089 A1 | 12/2014 | Lienhart | |
| 2014/0364148 A1 | 12/2014 | Block | |
| 2014/0365120 A1 | 12/2014 | Vulcano | |
| 2015/0011242 A1 | 1/2015 | Nagaraj | |
| 2015/0026588 A1* | 1/2015 | Turcotte et al. | 715/745 |
| 2015/0026623 A1 | 1/2015 | Horne | |
| 2015/0031397 A1 | 1/2015 | Jouaux | |
| 2015/0082396 A1* | 3/2015 | Theebaprakasam et al. | 726/5 |
| 2015/0319169 A1 | 11/2015 | Cronin | |
| 2015/0358315 A1 | 12/2015 | Cronin | |
| 2015/0358333 A1 | 12/2015 | Cronin | |

FOREIGN PATENT DOCUMENTS

| | | |
|---|---|---|
| WO | WO 2015/187452 | 12/2015 |
| WO | WO 2015/187504 | 12/2015 |
| WO | WO 2015/187505 | 12/2015 |

OTHER PUBLICATIONS

Constantin, Lucian; "Fingerprint sensor in iPhone 5s is no silver bullet, researchers say", Computerworld, Sep. 20, 2013.

Falcon, Alvaris; "20 Gadgets That Make Your Smartphone even Smarter", hongkiat.com, 2012.

FingerQ. Copyright 2013-2014 FingerQ Macao Commercial Offshore Limited. Date of download Jul. 5, 2014. Http://www.fingerq.com/FQCA/fingerqchat.php?target=voicechat&lang=en.

"First Watch Security SRG717 SecuRemote Garage Access System", A fine WordPress.com site, Jun. 7, 2013.

Othoman, Asem; Ross, Arun; "Mixing fingerprints", SPIE, 2013.

Secure. Simple. Always Available., www.SenditCertifiedl.com, Video Reference best viewed at this link: https://www.youtube.com/watch?v=w2SO7DBzVsQ. Date of download Jul. 10, 2014.

Secure. Simple. Always Available., Proof of Delivery Log, www.SenditCertifiedl.com, Video Reference best viewed at this link: https://www.youtube.com/watch?v=mUKI2aXHdB4. Date of download Jul. 10, 2014.

"Wifi Garage Door Options" Postscapes, download date Dec. 17, 2013.

PCT Application No. PCT/US2015/032883 International Search Report and Written Opinion mailed Aug. 21, 2015.

PCT Application No. PCT/US2015/033387 International Search Report and Written Opinion mailed Aug. 25, 2015.

(56) References Cited

OTHER PUBLICATIONS

U.S. Appl. No. 14/622,803; Final Office Action mailed Dec. 4, 2015.
PCT Application No. PCT/US2015/033389 International Search Report and Written Opinion mailed Sep. 2, 2015.
U.S. Appl. No. 14/622,803 Office Action mailed Apr. 8, 2016.
U.S. Appl. No. 14/622,806 Final Office Action mailed May 19, 2016.
U.S. Appl. No. 15/070,676, John Cronin, Secure Communications Smartphone System, filed Mar. 16, 2016.

* cited by examiner

COMMUNITY BIOMETRIC AUTHENTICATION ON A SMARTPHONE

The present application claims the priority benefit of U.S. provisional application No. 62/007,786 filed Jun. 4, 2014 and entitled "Community Biometric Authentication on a Smartphone," the disclosure of which is incorporated herein by reference.

BACKGROUND OF THE INVENTION

1. Field of the Invention

The present invention generally concerns biometric authentication on a user device. More particularly, the present invention concerns automatically creating a travel reservation on a user device.

2. Description of the Related Art

Users often make use of mobile devices (e.g., smartphones) to conduct mobile banking or to use other mobile applications where authentication is required for access. Financial transaction service providers (e.g., banks, stock market trading companies, tax preparation companies) often deploy their services over a network (e.g., the internet), so that a user may conduct financial transactions and manage his or her financial data over the internet by way of an internet-connected mobile device.

Biometric authentication utilizes a combination of sensors and specialized software to allow users to authorize actions simply by providing biometric input, such as a fingerprint scan or a voice sample. Biometrics can provide a high degree of security without requiring individuals to carry an identification card or remember a password. Existing user devices (e.g., smartphones) may use biometric authentication to perform simple tasks such as allowing a user to access the user device only after providing a fingerprint.

Existing biometric authentication systems and user devices do not, however, collect and store biometric data from multiple users to be employed in the joint authorization in specified tasks. Group biometric authentication of this nature would be useful for actions that require multiple individuals to authorize an action, including financial transactions or tax filings (e.g., for jointly-held accounts or tax filings). Additionally, the current operating systems of existing smartphones are not capable of receiving information from a user that specifies what actions require group authentication or of defining the members of such a group.

Thus, there is a need for group biometric authentication that may be appliable in any suitable fields where user authentication may be required, including applications in the fields of financial transactions, healthcare, social media and gaming.

SUMMARY OF THE CLAIMED INVENTION

Methods and systems are presented for performing group biometric authentication on a user device. In some embodiments, a user may specify in biometric settings certain biometric authentication applications to be used with a group biometric authentication system. A user may additionally specify in biometric settings other users to add to a biometric authentication group. A user may perform functions or access data in biometric authentication-enabled applications that require the biometric authentication of one or more other users by transmitting a request to the user device of the one or more other users for the required biometric data.

Various embodiments may include methods for performing group biometric authentication on a user device. These methods may include receiving user input via a user interface of the user device. The received user input may include selecting a task for performance within an application on user device, and performing the task may require biometric authentication. These methods may further include receiving biometric authentication data from the user at a sensor of the user device as requested by the application for performance of the selected task. These methods may further include determining that the selected task requires second biometric authentication data from a second user and transmitting a request over a network for the second biometric authentication data to a second user device associated with the second user. These methods may further include receiving the second biometric authentication data transmitted over the network by the second user device and performing the selected task. The biometric authentication data and the second biometric authentication data may be provided to the application for group biometric authentication.

Various embodiments may further include systems for performing group biometric authentication on a user device. Such systems may include a user interface that receives biometric authentication data from the user at a sensor of the user device. Such biometric authentication data may be requested by the application for performance of the selected task. Such systems may further include a memory that stores instructions and a processor that executes the instructions stored in the memory to receive biometric authentication data from the user at a sensor of the user device where the biometric authentication data is requested by the application for performance of the selected task. The execution of instructions by the processor may further determine that the selected task requires second biometric authentication data from an second user and transmit a request over a network for the second biometric authentication data to a second user device associated with the second user. The second biometric authentication data may be received from over the network by the second user device, and the first user device may then perform the selected task. The biometric authentication data and the second biometric authentication data may be provided to the application for group biometric authentication.

Embodiments of the present invention may further include non-transitory computer-readable storage media, having embodied thereon a program executable by a processor to perform methods for performing group biometric authentication on a user device as described herein.

DETAILED DESCRIPTION

Methods and systems are presented for performing biometric authentication of a plurality of users on a user device (e.g., smartphone). In some embodiments, a user may specify in biometric settings certain biometric authentication applications to be used with a group biometric authentication system. A user may additionally specify in biometric settings other users to add to a biometric authentication group. A user may perform functions or access data in biometric authentication-enabled applications (e.g., a financial application) that require the biometric authentication of one or more other users by transmitting a request to the user device of the one or more other users for the required biometric data (e.g., a fingerprint scan).

Figure 1:
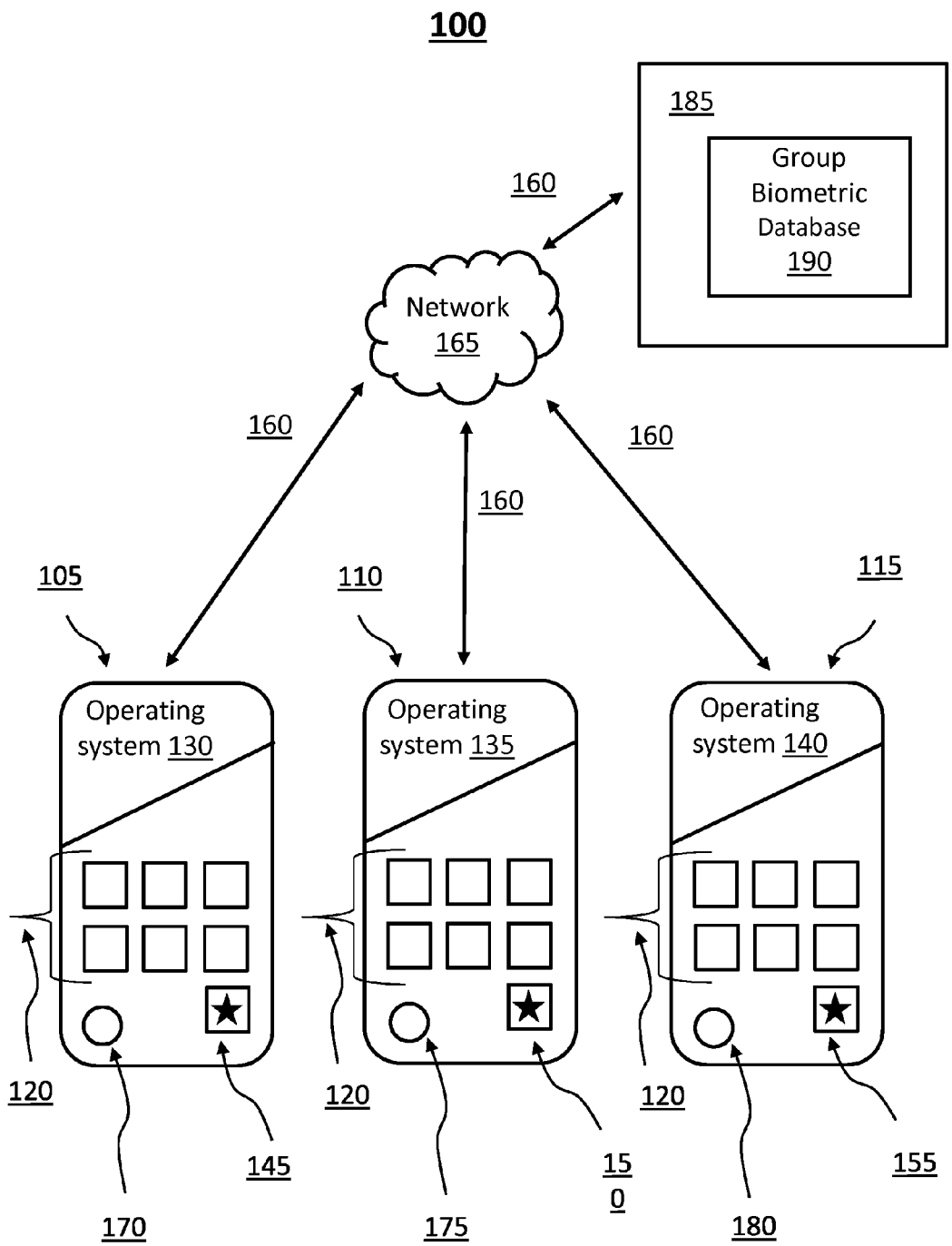
FIG. 1 illustrates an exemplary network environment in which a system for performing group biometric authentication on a user device may be implemented.

FIG. 1 illustrates an exemplary network environment in which a system for performing group biometric authentication on a user device may be implemented. Network environment 100 may include user devices 105-115, network 165, network connections 160, group biometric server 185, and group biometric database 190. Any combination of the components illustrated in network environment 100, including user devices 105, 110, and 115, network 165, network connections 160, group biometric server 185, and group biometric database 190, and blocks, processes, or subsystems of each, and any other hardware, software, or both, for implementing the features described in the present disclosure may be collectively referred to, herein, as "the system."

User devices 105-115 may correspond to any number of different electronic user devices 105-115, such as general purpose computers, mobile phones, smartphones, personal digital assistants (PDAs), portable computing devices (e.g., laptop, netbook, tablet), desktop computing devices, handheld computing device, or any other type of computing device capable of communicating over network 165. User devices 105-115 may also be configured to access data from other storage media, such as memory cards or disk drives as may be appropriate in the case of downloaded services. User devices 105-115 may include standard hardware computing components, including, for example, network and media interfaces, non-transitory computer-readable storage (memory), and processors for executing instructions that may be stored in memory.

In the illustrated embodiment, user devices 105-115 (e.g., smartphones) include a display (not shown). In some implementations, the display may be a touchscreen display (e.g., a display for inputting a fingerprint scan biometric). In some implementations, the display is a user interface. As shown in the illustrated embodiment, the display may display icons corresponding to applications 120. The display may include any suitable soft keys. User devices 105-115 may each include respective biometric sensor 170. It will be understood that user devices 105-115 may include other elements not shown, for example, a speaker, microphone, camera, light, or any other suitable hardware or software elements.

User devices 105-115 may each include a respective operating system 130-140. Operating systems 130-140 may be software that manages the use of hardware, computer programs, and applications 120. Operating systems 130-140 may be, for example, Windows, iOS, OS X, Android, UNIX, or Linux. User devices 105-115 may additionally include settings (not shown), which may include configurable components of respective operating system 130-140. The settings may be modifiable by a user of the user device to alter the performance of respective operating system 130-140 and other software on user devices 105-115. In some embodiments, the settings may be an application on the respective user devices 105-115, by which a user may select options and preferences and configures operating system functions. In an example, operating system 130 of user devices 105-115 (e.g., an Apple device) may be iOS, and the settings of user devices 105-115 may be iOS settings. In another example, operating system 130 may be LINUX, and the settings may be LINUX configuration files. In some embodiments, the settings may include personal assistant settings, which are modifiable by a user to alter the performance of group biometric applications 130-140 of respective user devices 105-115. In some embodiments, the settings may be modifiable by a user to configure access to and/or sharing of data with group biometric server 185.

User devices 105-115 may include any suitable software or applications. In some embodiments, personal assistant software (not shown) runs on user devices 105-115. The personal assistant may be software capable of performing tasks for a user based on, for example, user input, location awareness (e.g., using a global positioning system), user settings, locally stored information and information accessible over a network (e.g., network 165) from a personal assistant server (not shown), group biometric server 185, and group biometric database 190. Existing, exemplary, personal assistants include, for example, SIRI™ services (for Apple devices), GOOGLE NOW™ services (for Google Android devices), S VOICE™ (for Samsung devices), and VOICE MATE™ services, (for LG Electronics devices). It will be understood that the examples of existing intelligent personal assistants described herein are merely exemplary, and the system of the present disclosure may be implemented using any suitable hardware and/or software. In some embodiments, depressing electromechanical button 120 may activate the personal assistant. In some embodiments, actuating a personal assistant soft key may turn the personal assistant ON or OFF.

Applications 120 are software modules on user devices 105-115, which may be downloaded from remote servers. Applications 120 may provide additional functions for user devices 105-115. For example, applications 120 may be any suitable applications downloaded from, for example, Apple Inc.'s APP STORE® (for Apple devices), GOOGLE PLAY® (for Google Android devices), or any other suitable database or server. In some embodiments, applications 140 may be software, firmware, or hardware that is integrated into the user devices 105-115.

Group biometric applications 145-155 may be software blocks running on respective user devices 105-115, which may be downloaded from a remote server. Group biometric software 145-155 may provide an interface for display of settings to users of respective user devices 105-115. In particular, a user may use a respective group biometric application 145-155 to set and view biometric authentication settings (e.g., biometric data access settings menu 210 described in connection with FIG. 2, which may be used to send and receive group biometric data to group biometric server 185 as well as to participate in group biometric operations. Group biometric authentication settings may also be set in group biometric applications 145-155 to specify from which external user devices biometric authentication data and requests for biometric authentication data may be retrieved.

Antennas (not shown) are a component of each of user devices 105-115. In some embodiments, user devices 105-115 may use antennas to send and receive information wirelessly. For example, antennas of user devices 105-115 may be a cellular data antenna, Wi-Fi antenna, or BLUETOOTH® antenna.

Network connections 160 may include any suitable wired or wireless transmission mediums or channels through which data may be communicated between user devices 105-115, network 165, and group biometric server 185. Network connections 160 may include, for example, a computer networking cable, an Ethernet cable, a cellular communications network, an Internet data trunk (e.g., single transmission channel), a wireless local area network, a wide area network, or a telecommunications network (e.g., 4G wireless network).

Network 165 may include the Internet, a system of interconnected computer networks that use a standard protocol, a dispersed network of computers and servers, a local network, a public or private intranet, any other coupled computing systems, or any combination thereof. In some embodiments, network 165 may be a cloud, which is a network of remote servers hosted on the Internet and used to store, manage, and process data in place of local servers or personal computers. User devices 105-115 may be coupled to network 165 though any suitable wired or wireless connection. In some embodiments, user devices 105-115 may be coupled to network 165 via network connections 160.

Network 165 may allow for communication between the user devices 105-115, group biometric server 185, and a personal assistant server (not shown) via various communication paths or channels. Such paths or channels may include any type of data communication link known in the art, including TCP/IP connections and Internet connections via Wi-Fi, BLUETOOTH, a Universal Mobile Telecommunications System (UMTS) network, or any other suitable data communication link. In that regard, network 165 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 165 allows for communication between any of the various components of network environment 100.

In some embodiments, group biometric server 185 may retrieve biometric authentication data outputted by user devices 105-115 over network 165. Group biometric server 185 may be coupled to network 165 and user device 105 by network connections 170. In some embodiments, group biometric server 185 may include group biometric database 190 for storing biometric authentication data outputted by user devices 105-115. In some embodiments, group biometric database 190 may also store user settings received at group biometric server 185 for sharing the stored biometric authentication data in accordance with the user settings. In some embodiments, as permitted by settings, biometric authentication data may be transmitted by operating systems 130-140 of user devices 105-115 to group biometric database 190 on group biometric server 185. In some embodiments, a plurality of other users may also be connected group biometric server 185, which manages sharing of biometric authentication data among the plurality of users based on respective user settings, which may be stored in the group biometric database 190. In some embodiments, users of respective user devices 105, 110, and 115 may link to each other in settings (e.g., access by group settings 215 of FIG. 2), and each user's respective biometric authentication data may be shared with the other users via group biometric server 185 and group biometric database 190.

Group biometric server 185 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud/network. Any of the aforementioned servers (or an integrated server) may take on certain client-side, cache, or proxy server characteristics. These characteristics may depend on the particular network placement of the server or certain configurations of the server.

Figure 2:
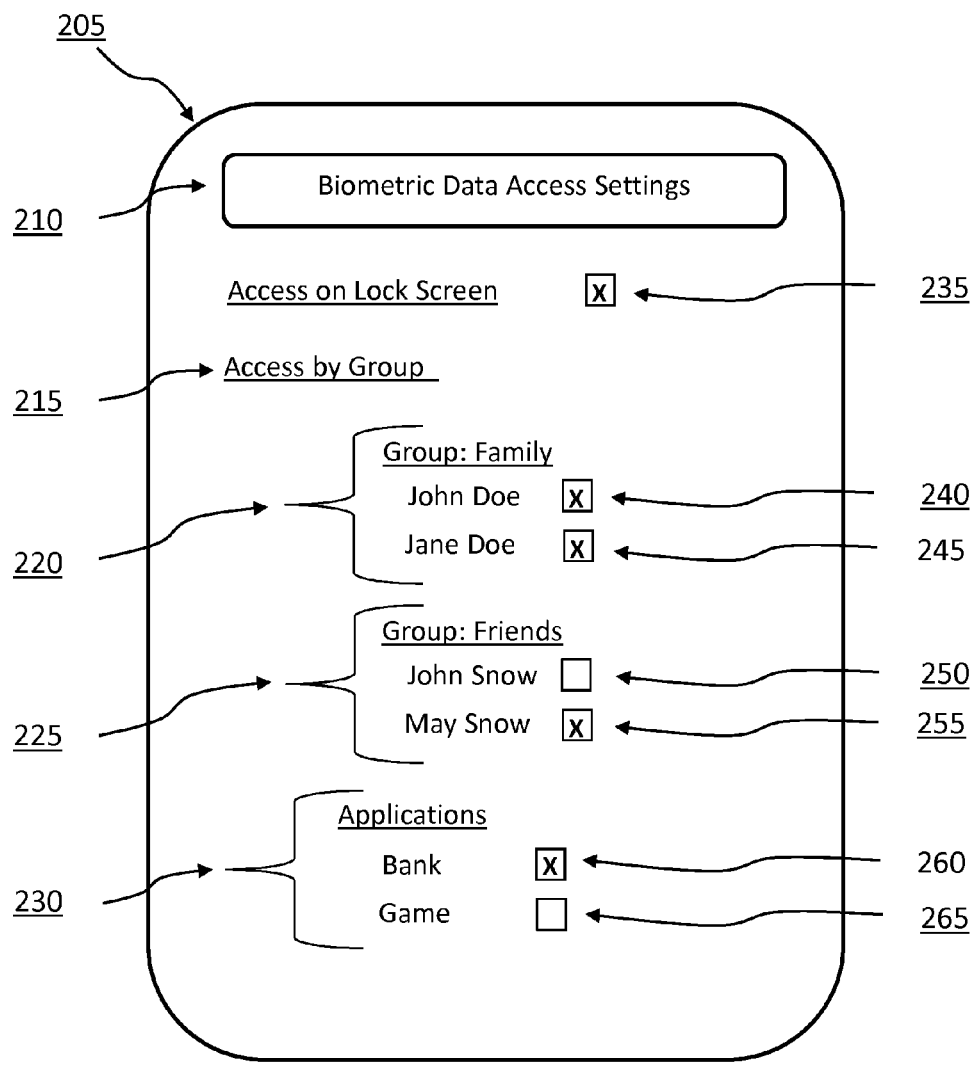
FIG. 2 is a diagram illustrating exemplary settings of an operating system on a user device that may be used with a system for performing group biometric authentication on a user device.

FIG. 2 is a diagram illustrating exemplary settings 200 of an operating system on a user device that may be used with a system for performing group biometric authentication on a user device. In some embodiments, settings 200 may be displayed on a display screen of user devices 105-115 of FIG. 1. Settings 200 may, for example, provide a mechanism by which a user may alter the functions of an operating system of a user device by implementing changes to settings. User interface 205 may facilitate user interaction with a user device. In some embodiments, settings 200 may include any suitable number of standard operating system or user device settings (not shown).

In some embodiments, settings 200 may include biometric data access settings menu 210. Biometric data access settings menu 210 may include user-editable features for customizing the functionality of an operating system or user device according to user preferences. In some implementations, settings of operating systems 130-140 of respective user devices 105-115 of FIG. 1 may be modified by the user interacting with options or commands in a respective biometric data access settings menu 210. Biometric data access settings menu 210 may include any number of user-selectable options or commands. In the illustrated embodiment, biometric data access settings menu 210 includes access on lock screen option 235, which is shown as selected.

In some embodiments, biometric data access settings menu 210 includes a list of user-selectable options or settings presented in a hierarchical order. For example, access by group settings 215 may be sub-settings under biometric data access settings menu 210. In an example, the selection of access by group settings 215 may group sub-settings 220-225. Access by group settings 215 include exemplary settings categories that, when selected by a user, may, for example, redirect the user to a respective new page, window, or dialogue box. In another example, when selected, any of the interface elements may expand to reveal sub-options, sub-commands, or any other suitable settings display elements.

In some embodiments, access by group settings 215 may include user-editable features for customizing the functionality of a biometric authentication application running on a user device. In some embodiments, access by group settings 215 may be used to customize the functionality of biometric authentication applications 145-155 of respective user devices 105-115 of FIG. 1. As illustrated in FIG. 2, access by group settings 215 may include a mechanism for selection and de-selection of trip scheduler settings. In the shown embodiment, selectable boxes (x-boxes) are illustrative examples of mechanisms for selection and de-selection of biometric authentication settings. In some embodiments, selections and de-selections in biometric data access settings menu 210 are binary selections.

In some embodiments, access by group settings 215 include a sub-menu of group settings 220-225, which are user-selectable options or commands for determining the functionality of group biometric authentication of the user device. Access by group settings 215 may include any suitable number of selectable group biometric authentication sub-settings 220-225, which may correspond to exemplary groups and group membership to be used in providing group biometric authentication features, as shown in FIG. 2.

In the illustrated embodiment, exemplary group biometric authentication settings 220-225 are shown. Family group setting 220 and friends group setting 225 are exemplary biometric groups, whose membership is editable by the user. The user may add new biometric authentication groups or remove biometric authentication groups in access by group settings 215. The user may also specify users to be included in or excluded from biometric groups in each sub-setting. For example, family group settings 220 is shown as activated with two exemplary members John Doe 240 and Jane Doe 245 shown as selected. A user may add additional users in family group settings 220 or may uncheck or otherwise deselect either or both of John Doe 240 and Jane Doe 245 to remove one or both from the group.

Friends group settings 225 is shown as activated, with one exemplary member May Snow 255 shown as selected. Friends group is shown to include a second exemplary user John Snow 250, but John Snow 250 is de-selected by the user, indicating he is not a member of the friends group. A user may add additional users in friends group settings 225, check or otherwise select John Snow 250 to add John Snow 250 to the group, and/or may uncheck or otherwise deselect May Snow 255 to remove her from the group.

Access by group settings 215 may also include allowed application settings 230. Using allowed application settings 230, a user may allow or disallow the use of group biometric authentication features or applications with the specified biometric-enabled applications. In the illustrated embodiment, allowed application settings 230 include one exemplary application, bank 260, which is shown as selected. Allowed application settings 230 also include a second exemplary application, game 265, but game 265 is shown to be de-selected, so group biometric authentication features or applications may not be used with game 265. A user may add additional applications in allowed application settings 230, check or otherwise select game 265 to add game 265 to the group, and/or may uncheck or otherwise deselect bank 260 to remove bank 260 from the group.

Figure 3A:
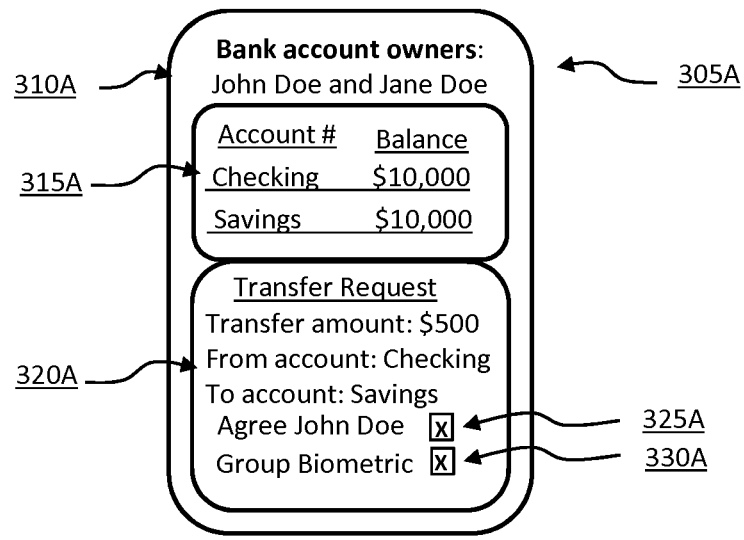
FIGS. 3A-C illustrate exemplary interfaces of a user device that may be used with a system for performing group biometric authentication on a user device.
Figure 3B:
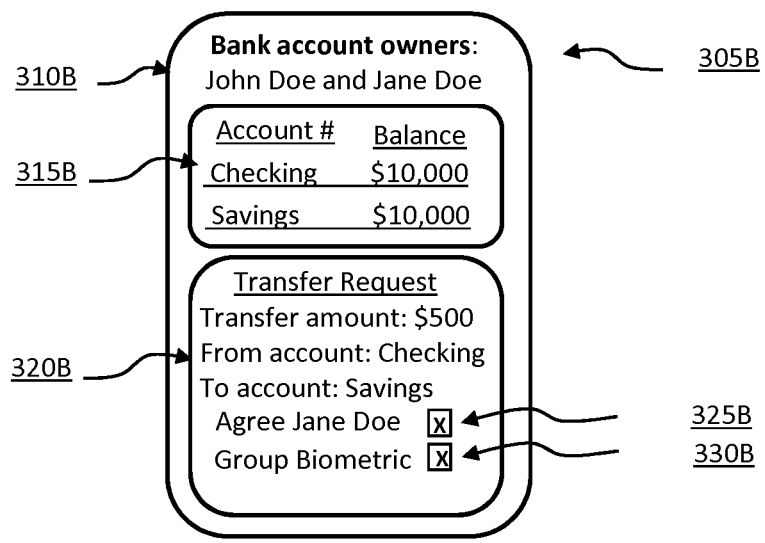
Figure 3C:
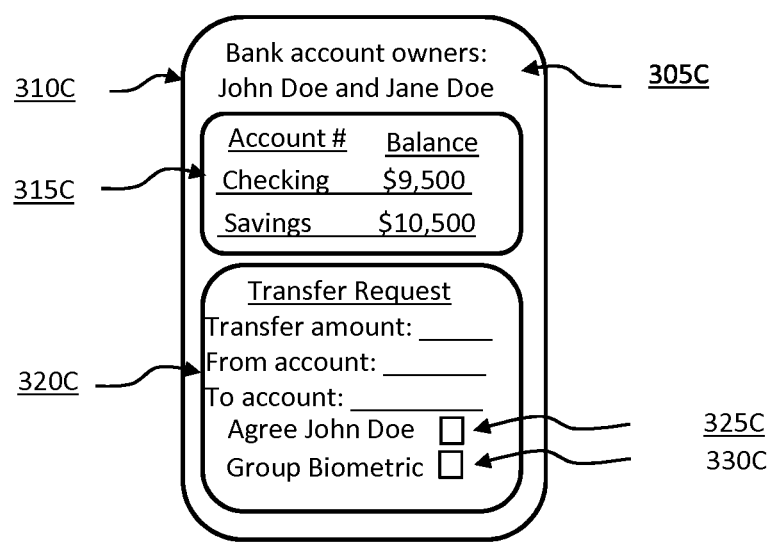

FIGS. 3A-C illustrate exemplary interfaces 310A-C of respective user devices 300A-C that may be used with a system for performing group biometric authentication on the respective user device 300A-C. In some embodiments, user devices 300A-C may correspond to any of user devices 105-115 of FIG. 1. In some embodiments, user interfaces 310A-C may correspond to exemplary user interfaces for performing biometric authentication of a group including two people, John Doe and Jane Doe, with a biometric authentication-enabled application on a respective user device 300A-C.

User device 300A includes display 305A and user interface 310A. In some embodiments, user device 300A may be associated with account owner John Doe. In the illustrated embodiment, user interface 310A shows an exemplary interface of a banking application, showing a jointly held bank account owned by John Doe and Jane Doe. In the illustrated example, biometric authentication of both John Doe and Jane Doe may be required for certain banking application features to be utilized with the joint bank account. In some embodiments, user interface 310A may include data display 315A and user input box 320A. In the illustrated embodiment, data display 315A shows generic bank account information, including, for example, savings account and checking account numbers as well as balances for both accounts. User input box 320A is depicted as presenting a "Transfer Request" of $500 to be transferred from a checking account to a savings account. In the illustrated embodiment, user John Doe has initiated the transfer request and provided e-authentication 325A as well as group biometric authentication 330A.

User device 300B includes display 305B and user interface 310B. In some embodiments, user device 300B may be associated with account owner Jane Doe. In some embodiments, user interface 310B may be presented to Jane Doe on display 305B in response to a request from John Doe to provide biometric authentication of a transfer of money, as described above in connection with FIG. 3A. It will be understood that a first user may initiate a biometric authentication request with a second user as long as the second user has specified the first user as an allowed user in biometric settings (e.g., access by group settings 214 of FIG. 2). In some embodiments, user interface 310B may include data display 315B and user input box 320B. As shown, data display 315B corresponds to data display 315A, and user input box 320B corresponds to user input box 320A of FIG. 3A, except with Jane Doe shown as the user whose authentication is required. In the illustrated embodiment, user Jane Doe has responded to the transfer request initiated by John Doe and has provided e-authentication 325B as well as group biometric authentication 330B.

User device 300C includes display 305C and user interface 310C. User interface 310C is associated with John Doe and may be prompted by Jane Doe's completion of e-authentication 325B and group biometric authentication 330B in FIG. 3B. User interface 310C includes data display 315C and user input box 320C. In the illustrated embodiment, data display 315C may correspond to data display 315A, and user input box 320C may correspond to user input box 320A of FIG. 3A. As illustrated, data display 315C shows confirmation that the $500 transfer requested by John Doe in FIG. 3A has been completed upon receipt of biometric authentication from John Doe in user input box 320A of FIG. 3A and from Jane Doe in user input box 320B of FIG. 3B.

It will be understood that interfaces 310A-C are merely exemplary and not provided by way of limitation. It will also be understood that group biometric features may be used with any suitable biometric-enabled application, if selected in user biometric authentication settings, and that a banking application is presented by way of illustration not limitation. It will also be understood that group biometric authentication may be used with any suitable number of users, if group access is permitted in user biometric settings of each, and that FIGS. 3A-C are described in the context of two users solely for purposes of brevity and clarity.

Figure 4:
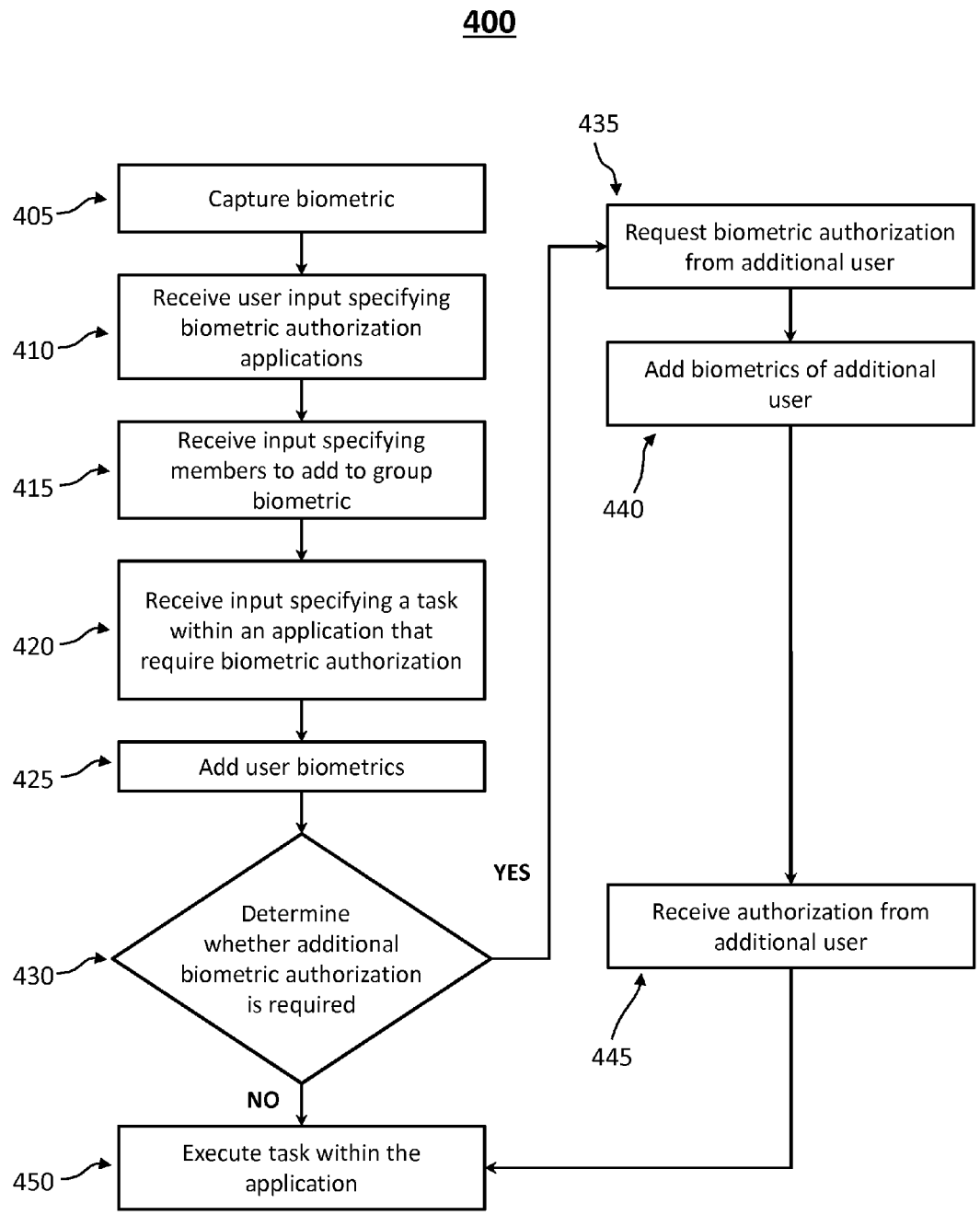
FIG. 4 is a flowchart illustrating an exemplary method for performing group biometric authentication on a user device.

FIG. 4 is a flowchart illustrating an exemplary method 400 for performing group biometric authentication on a user device. In some embodiments, method 400 may be implemented on user devices 105-115 of FIG. 1. In some embodiments, biometric authentication functionality for performing group biometric authentication may be embedded in the operating system of a user device.

In step 405, biometric data may be captured from a user associated with a user device. Biometric data may include any suitable biometric data receivable at an interface of the user device. For example, biometric data may include fingerprint data (e.g., captured at touchscreen display of user device), facial recognition data (e.g., captured with camera of user device), or voice recognition data (e.g., captured with microphone of user device).

In step 410, user input may be received specifying allowed biometric authentication applications. In some embodiments, the user may specify in biometric authentication settings (e.g., allowed application setting 230) what biometric-enabled applications on the user device are and are not to be used with group biometric authentication features.

In step 415, input may be received specifying members to add to biometric groups for use with group biometric authentication. In some embodiments, each member of a group must have provided permission for each of the other group members in biometric authentication settings in order for the group to participate in group biometric authentications. A user may specify group membership in biometric authentication settings as described above in connection with FIG. 2.

In step 420, input may be received specifying a task within an application that will require biometric authorization. For example, input may be received from a first user requesting to file a tax return jointly with a second user on a biometric-enabled tax return application.

In step 425, user biometrics may be added. In some embodiments, the added user biometrics may correspond to biometric input received at the user device from the user seeking to perform the task requiring biometric authentication.

In step 430, it may be determined whether additional biometric authorization is required. In some embodiments, it may be determined whether additional biometric authorization is needed from any suitable number of users based on the task specified in step 420. If the system determines that additional biometric authentication is not required, the system may proceed down the path marked "NO" to step 450. If the system determines that additional biometric authentication is required, the system may proceed down the path marked "YES" to step 435.

In step 435, biometric authorization may be requested from additional user (e.g., biometric authentication 330B is requested of user Jane Doe in FIG. 3B). In some embodiments, biometric authorization may be requested from any number of necessary additional users (i.e., other biometric group members). In some embodiments, biometric authentication may be requested via the application providing the task specified at step 420. In some embodiments, a biometric application on a user device may provide a notification of the request for the necessary user's biometric authentication. In some embodiments, the biometric authentication is requested by communicating with a user device of the requested user over a network (e.g., network 165 of FIG. 1). In some embodiments, a biometric authentication server may receive a request from a first user over a network for biometric authentication of a second user and may transmit the request to the second user over the network.

In step 440, the system may add biometrics of additional user requested in step 435. In some embodiments, the biometrics may be added by the biometric authentication server. In some embodiments, biometric authentication data may be stored in a group biometric database on biometric authentication server (e.g., group biometric server 185 and group biometric database 190 of FIG. 1).

In step 445, authorization may be received from the additional user. In some embodiments, the biometric authentication server may require authorization from the additional user before transmitting the additional user's biometric authorization data.

At step 450, the task may be executed within the application (e.g., bank transfer feature described in connection with FIGS. 3A-3C).

Figure 5:
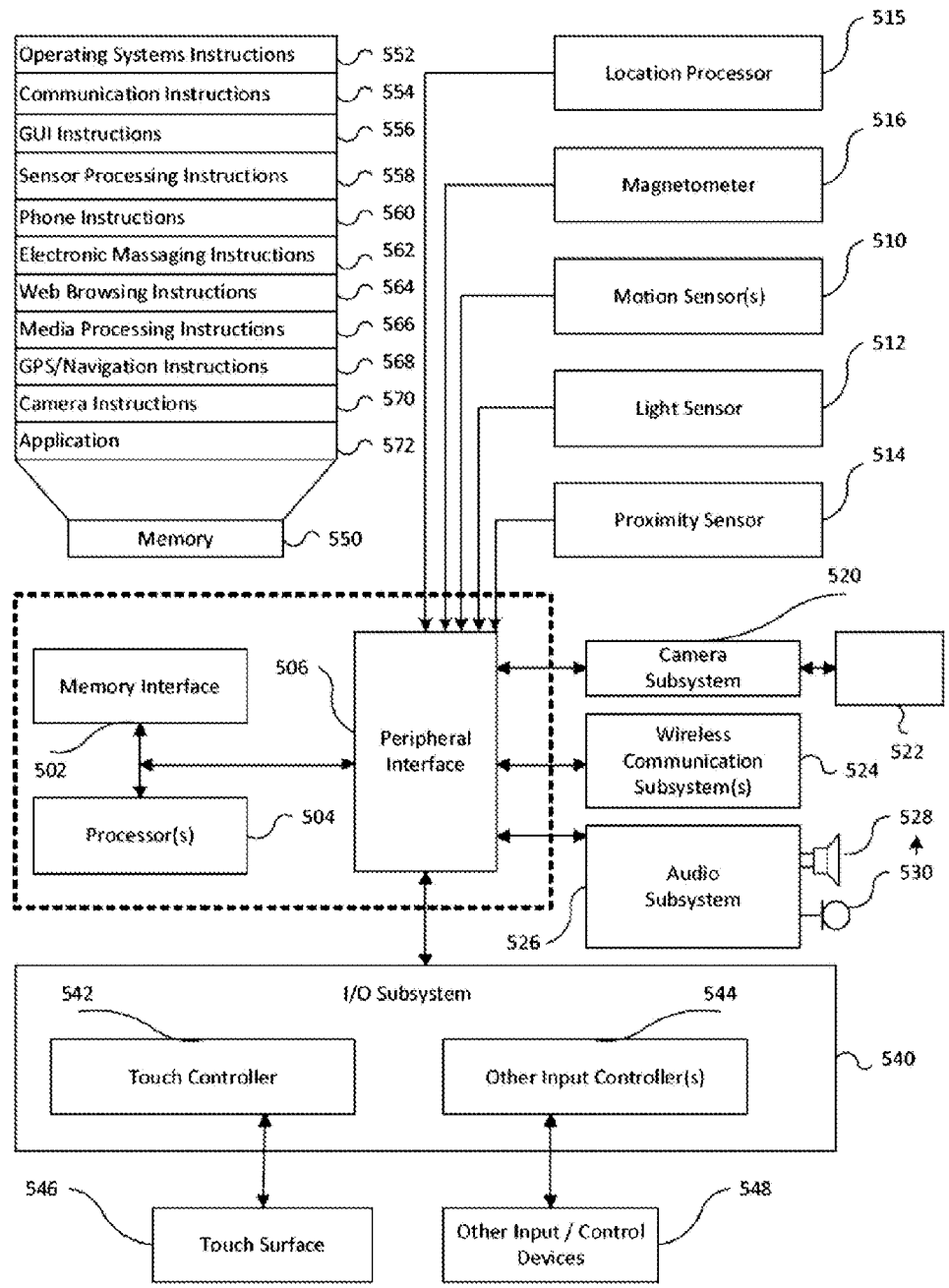
FIG. 5 illustrates a mobile device architecture that may be utilized to implement the various features and processes described herein.

FIG. 5 illustrates a mobile device architecture that may be utilized to implement the various features and processes described herein. Architecture 500 can be implemented in any number of portable devices including but not limited to smart phones, electronic tablets, and gaming devices. Architecture 500 as illustrated in FIG. 6 includes memory interface 502, processors 504, and peripheral interface 506. Memory interface 502, processors 504 and peripherals interface 506 can be separate components or can be integrated as a part of one or more integrated circuits. The various components can be coupled by one or more communication buses or signal lines.

Processors 504 as illustrated in FIG. 5 is meant to be inclusive of data processors, image processors, central processing unit, or any variety of multi-core processing devices. Any variety of sensors, external devices, and external subsystems can be coupled to peripherals interface 506 to facilitate any number of functionalities within the architecture 500 of the exemplar mobile device. For example, motion sensor 510, light sensor 512, and proximity sensor 514 can be coupled to peripherals interface 506 to facilitate orientation, lighting, and proximity functions of the mobile device. For example, light sensor 512 could be utilized to facilitate adjusting the brightness of touch surface 546. Motion sensor 510, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 506, such as a temperature sensor, a biometric sensor, or other sensing device to facilitate corresponding functionalities. Location processor 515 (e.g., a global positioning transceiver) can be coupled to peripherals interface 506 to allow for generation of geo-location data thereby facilitating geo-positioning. An electronic magnetometer 516 such as an integrated circuit chip could in turn be connected to peripherals interface 506 to provide data related to the direction of true magnetic North whereby the mobile device could enjoy compass or directional functionality. Camera subsystem 520 and an optical sensor 522 such as a charged coupled device (CCD) or a complementary metal-oxide semiconductor (CMOS) optical sensor can facilitate camera functions such as recording photographs and video clips.

Communication functionality can be facilitated through one or more communication subsystems 524, which may include one or more wireless communication subsystems. Wireless communication subsystems 524 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 524 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 524 may include hosting protocols such that the device may be configured as a base station for other wireless devices. Communication subsystems can also allow the device to synchronize with a host device using one or more protocols such as TCP/IP, HTTP, or UDP.

Audio subsystem 526 can be coupled to a speaker 528 and one or more microphones 530 to facilitate voice-enabled functions. These functions might include voice recognition, voice replication, or digital recording. Audio subsystem 526 in conjunction may also encompass traditional telephony functions.

I/O subsystem 540 may include touch controller 542 and/or other input controller(s) 544. Touch controller 542 can be coupled to a touch surface 546. Touch surface 546 and touch controller 542 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 546 may likewise be utilized. In one implementation, touch surface 546 can display virtual or soft buttons and a virtual keyboard, which can be used as an input/output device by the user.

Other input controllers 544 can be coupled to other input/control devices 548 such as one or more buttons, rocker switches, thumb-wheels, infrared ports, USB ports, and/or a pointer device such as a stylus. The one or more buttons (not shown) can include an up/down button for volume control of speaker 528 and/or microphone 530. In some implementations, device 500 can include the functionality of an audio and/or video playback or recording device and may include a pin connector for tethering to other devices.

Memory interface 502 can be coupled to memory 550. Memory 550 can include high-speed random access memory or non-volatile memory such as magnetic disk storage devices, optical storage devices, or flash memory. Memory 550 can store operating system 552, such as Darwin, RTXC, LINUX, UNIX, OS X, ANDROID, WINDOWS, or an embedded operating system such as VxWorks. Operating system 552 may include instructions for handling basic system services and for performing hardware dependent tasks. In some implementations, operating system 552 can include a kernel.

Memory 550 may also store communication instructions 554 to facilitate communicating with other mobile computing devices or servers. Communication instructions 554 can also be used to select an operational mode or communication medium for use by the device based on a geographic location, which could be obtained by the GPS/Navigation instructions 568. Memory 550 may include graphical user interface instructions 556 to facilitate graphic user interface processing such as the generation of an interface; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes, camera instructions 570 to facilitate camera-related processes and functions; and instructions 572 for any other application that may be operating on or in conjunction with the mobile computing device. Memory 550 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 550 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically performing group biometric authentication on a user device, the method comprising:
 defining a biometric authentication group, wherein the biometric authentication group includes a plurality of users and a plurality of applications, and wherein membership of one or more of the plurality of users in the biometric authentication group is editable by a first user;
 establishing one or more conditions between two or more users for one or more applications of the biometric authentication group, wherein the one or more conditions specify when biometric authentication is required from each of the users of the biometric authentication group with respect to the one or more applications, and what type of biometric authentication will be used;
 receiving a first user input via a first user interface of the first user device, wherein the received first user input includes selecting a task for performance within an application of the first user device, wherein the application of the first user device is an application subject to the biometric authentication group, and wherein performing the task requires biometric authentication;

receiving a first biometric authentication data from the first user at a biometric sensor of the first user device;

executing instructions stored in memory, wherein the execution of the instructions by the processor determines that the selected task from the first user associated with the application subject to the biometric authentication group requires second biometric authentication data from one or more second users, and wherein the determination is based on the established one or more conditions for the application within the biometric authentication group;

transmitting a request over a network for the second biometric authentication data to user devices associated with the second user;

receiving the second biometric authentication data transmitted over the network by the second user devices, wherein the first biometric authentication data and the second biometric authentication data are provided to the application for group biometric authentication; and executing the selected task within the application of the first user device, wherein the selected task is allowed to be executed based on the received first biometric authentication data, the received second biometric authentication data, and the one or more established conditions of the biometric authentication group.

2. The method of claim 1, further comprising receiving user input via a user interface of the user device, wherein the received user input includes group biometric settings.

3. The method of claim 2, wherein a group biometric feature is activated based on the group biometric settings.

4. The method of claim 3, wherein the user device is a smartphone.

5. The method of claim 4, wherein activating the group biometric feature comprises executing a group biometric application on the smartphone.

6. The method of claim 4, wherein the group biometric settings are displayed in an interface of the group biometric application.

7. The method of claim 2, wherein the group biometric settings designate allowed applications, and wherein group biometric authentication data is only provided to allowed applications.

8. The method of claim 2, wherein the group biometric settings designate allowed users, and wherein a request for biometric authentication data is only transmitted to an allowed user.

9. The method of claim 1, wherein the application is a banking application, and wherein the task includes performing an action that affects assets in a bank account jointly held by the user and the second user.

10. The method of claim 1, wherein the request for second biometric authentication data is transmitted to the second user device via a remote group biometric server.

11. The method of claim 10, wherein the remote group biometric server includes a group biometric database, and wherein the group biometric server stores second biometric authentication data in the group biometric database.

12. The method of claim 10, wherein the remote group biometric server automatically transmits the second biometric data stored in the group biometric database to the user device when authorization is received from the second user device at the remote group biometric server.

13. The method of claim 1, wherein the biometric authentication data includes fingerprint data, and the user device receives the fingerprint data via a touchscreen display.

14. The method of claim 1, wherein the biometric authentication data includes voice data, and the user device receives the fingerprint data via a microphone of the user device.

15. An apparatus for automatically performing group biometric authentication on a user device, the apparatus comprising:

a user interface that receives a first user input, wherein the received first user input includes selecting a task for performance within an application of the user device associated with a first user, wherein the application of the first user device is an application subject to the biometric authentication group, and wherein performing the task requires biometric authentication from one or more second users;

a biometric sensor that receives biometric authentication data from the first user;

a processor that executes the instructions stored in the memory to determine that the selected task associated with the application subject to the biometric authentication group requires second biometric authentication data from one or more second users, wherein the determination is based on established one or more conditions for the application within the biometric authentication group; and a communication interface that:
defines a biometric authentication group, wherein the biometric authentication group includes a first user one or more second users, and a plurality of applications and wherein membership of the one or more second users in the biometric authentication group is editable by a first user;

establishes one or more conditions between the first user and the second users for one or more applications of the biometric authentication group, wherein the one or more conditions dictate when biometric authentication is required from each of the users of the biometric authentication group with respect to one or more applications;

transmits a request over a network for the second biometric authentication data to a second user device associated with the second user;

receives the second biometric authentication data transmitted over the network by the second user device;

wherein the processor executes the selected task within the application of the first user device, and wherein the selected task is allowed to be executed based on the received first biometric authentication data, the received second biometric authentication data, and the one or more established conditions of the biometric authentication group.

16. The apparatus of claim 15, wherein the user interface further receives user input, wherein the received user input includes group biometric settings.

17. The apparatus of claim 16, wherein a group biometric feature is activated based on the group biometric settings.

18. The apparatus of claim 16, wherein the user device is a smartphone.

19. A non-transitory computer-readable storage medium, having embodied thereon a program executable by a processor for automatically performing group biometric authentication on a user device, the method comprising:

defining a biometric authentication group, wherein the biometric authentication group includes a plurality of users and a plurality of applications, and wherein membership of one or more of the plurality of users in the biometric authentication group is editable by a first user;

establishing one or more conditions between two or more users for one or more applications of the biometric authentication group, wherein the one or more conditions specify when biometric authentication is required from each of the users of the biometric authentication group with respect to the one or more applications, and what type of biometric authentication will be used;

receiving a first user input via a first user interface of the first user device, wherein the received first user input includes selecting a task for performance within an application of the first user device, wherein the application of the first user device is an application subject to the biometric authentication group, and wherein performing the task requires biometric authentication;

receiving a first biometric authentication data from the first user;

determining that the selected task from the first user associated with the application subject to the biometric authentication group requires second biometric authentication data from one or more second users, and wherein the determination is based on the established one or more conditions for the application within the biometric authentication group;

transmitting a request over a network for the second biometric authentication data to a second user device associated with the second user;

receiving the second biometric authentication data transmitted over the network by the second user device, wherein the first biometric authentication data and the second biometric authentication data are provided to the application for group biometric authentication; and executing the selected task within the application of the first user device, wherein the selected task is allowed to be executed based on the received first biometric authentication data, the received second biometric authentication data, and the one or more established conditions of the biometric authentication group.

* * * * *